United States Patent [19]

Sonoda et al.

[11] 4,153,106

[45] May 8, 1979

[54] PARALLEL FLOW TYPE EVAPORATOR

[75] Inventors: Noriaki Sonoda; Kiyoshi Koike, both of Tokyo, Japan

[73] Assignee: Nihon Radiator Co., Ltd. (Nihon Rajieeta Kabushiki Kaisha), Tokyo, Japan

[21] Appl. No.: 773,237

[22] Filed: Mar. 1, 1977

[30] Foreign Application Priority Data

Mar. 9, 1976 [JP] Japan .............................. 51-27005[U]
May 11, 1976 [JP] Japan .............................. 51-58392[U]

[51] Int. Cl.$^2$ ............................................. F28F 9/22
[52] U.S. Cl. ...................... 165/174; 62/504; 62/525; 165/44
[58] Field of Search .................. 165/44, 174, 110, 114; 62/504, 525

[56] References Cited

U.S. PATENT DOCUMENTS

| 1,684,083 | 9/1928 | Bloom .................................... | 62/525 |
| 3,710,854 | 1/1973 | Staub ..................................... | 165/174 |
| 3,976,128 | 8/1976 | Patel et al. ............................ | 165/174 |

*Primary Examiner*—Sheldon Richter
*Attorney, Agent, or Firm*—Blum, Moscovitz, Friedman & Kaplan

[57] ABSTRACT

The 1st type of parallel flow evaporator, comprising an upper tank and a lower tank, a plurality of flat pipes communicating said upper and lower tanks, fins inserted between each of said flat pipes, having an outlet pipe and an inlet pipe respectively, said outlet pipe being inserted into the innermost of said upper tank and provided with bores at respective positions above each of said flat pipes, and said outlet and inlet pipes are respectively inserted on the windward of said upper and lower tanks.

The 2nd type of parallel flow evaporator, comprising an outlet tank and an inlet tank arranged side by side before and after along the wind course, a plurality of flat pipes formed into inverted U-shape communicating said outlet and inlet tanks, fins inserted between each of said flat pipes, each of said tanks is respectively communicated with said inlet and outlet pipes, and said outlet pipe being inserted into the innermost of said outlet tank and provided with bores at respective positions below each of said flat pipes, and said outlet and inlet pipes are respectively inserted on the windward of said tanks.

3 Claims, 10 Drawing Figures

F I G. 1
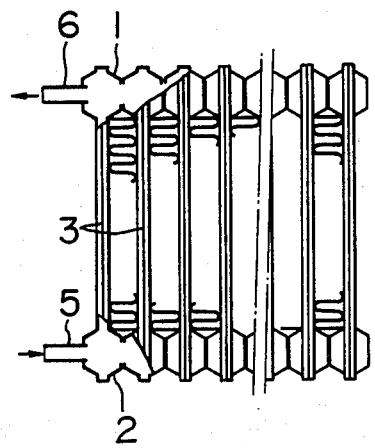
F I G. 2
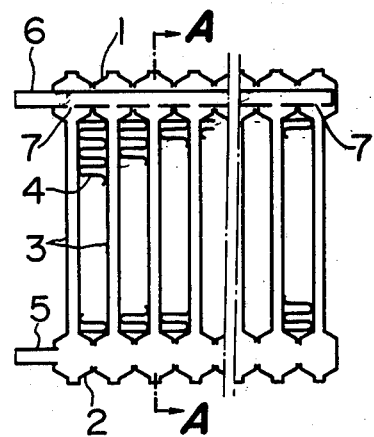
F I G. 3     F I G. 4     F I G. 5
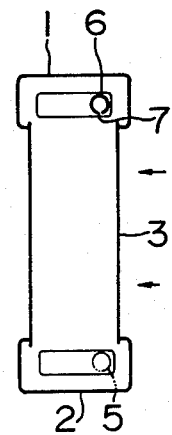 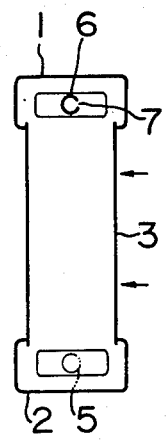 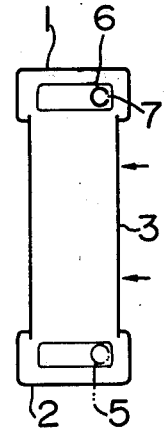

4,153,106

PARALLEL FLOW TYPE EVAPORATOR

BACKGROUND OF THE INVENTION

Usually, as an evaporator for car cooler and the like, such a parallel flow type as shown in FIG. 1 has been generally used, in which deep recesses are formed at end portions of a metallic plate, two of which are communicated through shallow recess, putting an inner fin between them and joined together facing each other to form a unit pipe having upper and lower tanks 1 and 2 and a flat pipe 3, then a plurality of these unit pipes are arranged in parallel and fins 4 are inserted between flat pipes 3 respectively. Walls of adjacent tanks 1, 1 and 2, 2 are bored for mutual communication to form upper and lower tanks. 5 is an inlet pipe for cooling medium and 6 is an outlet pipe therefor.

Liquid cooling medium supplied from the inlet pipe 5 into the lower tank 2 flows through the flat pipes 3 into the upper tank 1, during which course the cooling medium absorbs heat of air flowing through the space between the flat pipes 3 and the fins 4.

In such a type of evaporator, however, it functions well when the flow rate of cooling medium fed from the inlet pipe 5 is sufficiently large, but as the flow rate thereof decreases, the quantity of the cooling medium flowing through each flat pipe 3 will become different between pipes located near the inlet pipe 5 and those far from it, and in extreme case the cooling medium does not flow utterly through remote pipes, but flows only through pipes adjacent to the inlet pipe to circulate within the evaporator, thus the hunting phenomenon becomes larger, resulting in remarkable trouble in the function of the evaporator.

SUMMARY OF THE INVENTION

This invention relates to improvements in parallel flow type evaporators to be used for car cooler and the like.

It is a general object of this invention to provide such evaporators having simple structure and favorable performance.

It is still more specific object of this invention to provide such evaporators as to eliminate uneven flow of cooling medium in lateral direction as mentioned above as well as to improve longitudinal flow thereof, thus to raise the efficiency of evaporators.

Other and further objects, features and advantages of this invention will appear more fully from the following description.

BRIEF DESCRIPTION OF THE DRAWINGS

FIG. 1 is an elevation partly in section, showing a conventional parallel flow type evaporator.

FIG. 2 to FIG. 5 show the 1st embodiment of this invention, wherein:

FIG. 2 is an approximate longitudinal sectional view, and FIG. 3 to FIG. 5 are sectional views taken along A—A line of FIG. 2, showing some examples of pipe arrangement.

FIG. 6 to FIG. 9 show the 2nd embodiment of this invention, wherein:

FIG. 6 is a perspective view thereof, FIG. 7 to FIG. 9 are sectional views taken along B—B line of FIG. 10.

DESCRIPTION OF THE PREFERRED EMBODIMENTS

Figure 6:
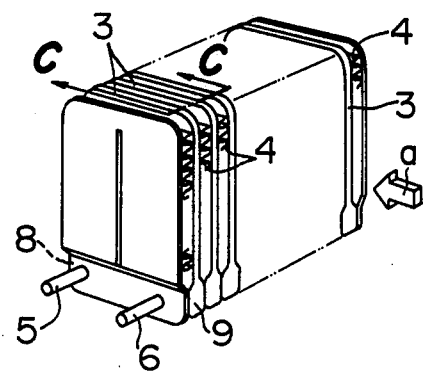

As shown in FIG. 2, in an evaporator according to the 1st embodiment of this invention, an outlet pipe 6 fitted to an upper tank 1 is inserted through whole length of the tank 1. The pipe 6 is provided with bores 7, 7 at respective positions above each of flat pipes 3, 3, so that cooling medium supplied from an inlet pipe 5 and flowed through a lower tank 2 and flat pipes 3, 3 into the upper tank 1 can flow into the outlet pipe 6 through said bores 7, 7.

As to the size of bores 7, 7 to be provided for the outlet pipe 6, it will be more effective when the bores are made larger as they advance inner of the outlet pipe for obtaining uniform supply of the cooling medium to each of flat pipes 3, 3 or when the bores 7 at central portion, where airflow blowing through the space between the flat pipes is large, are made larger for obtaining larger supply of the cooling medium to the central flat pipes 3, 3. Here, the bores 7 may include slits.

In the above mentioned embodiment, both of the inlet pipe 5 and the outlet pipe 6 are respectively inserted at the center of the lower and upper tanks 2 and 1, however, when the pipes 5 and 6 are respectively inserted near the windward of the tanks 1 and 2 as shown in FIG. 3, or when the bore 7 is provided on the windward as shown in FIG. 4, or when the outlet pipe 6 provided with the bore 7 on the windward and the inlet pipe 5 are inserted near the windward of the tanks 1 and 2 as shown in FIG. 5, then large quantity of cooling medium will be flowed on the windward, where the temperature of the open air blowing through the flat pipes 3 is the highest and liquid cooling medium may be most easily evaporated.

Since the parallel flow type evaporator according to the 1st embodiment of this invention is constructed as mentioned above, even when the flow rate of cooling medium is small, proper quantity of cooling medium is distributed to each flat pipe, and within one flat pipe, large quantity of cooling medium is made to flow through such portions where the medium may be easily evaporated, so that the efficiency of evaporator may be largely improved to be used effectively in practice.

As shown in FIG. 6, in an evaporator according to the 2nd embodiment of this invention, the flow of cooling medium is bent by forming the flat pipes 3 into inverted U-shaped. On both ends of the inverted U-shaped flat pipes 3, an inlet tank 8 is formed on the leeward and an outlet tank 9 on the windward relative to blow through air flow a. To form such flat pipe 3, tanks 8 and 9, deep recesses 8a, 9a are formed at lower portion of a square metallic plate 10 (FIG. 7), two of which are communicated through shallow U-shaped recess 3a and joined face to face at peripheral edge 10a of the metallic plate and at intermediate portion 10b of the recess 3a of the U-shape, thus to form a unit pipe having inlet and outlet tank portions 8, 9 and a flat pipe portion 3. To make an evaporator, a plurality of thus formed unit pipes are arranged in parallel and fins 4 are inserted between flat pipes 3 respectively, then walls of adjacent tanks 8, 8, and 9, 9 are bored for mutual communication to form inlet and outlet tanks, within which an inlet pipe and an outlet pipe are respectively communicated to complete an evaporator as shown in FIG. 6.

Figure 7:
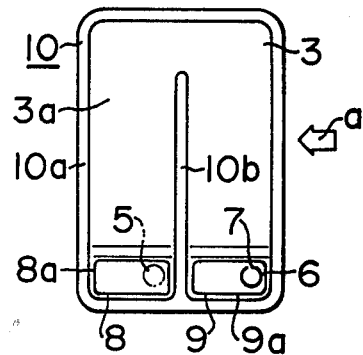
Figure 8:
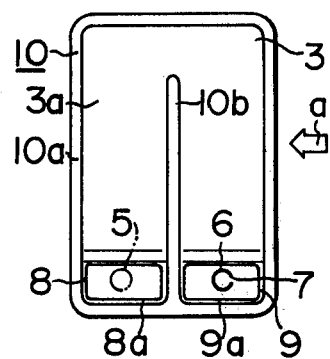
Figure 9:
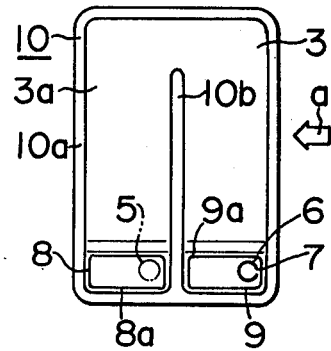
Figure 10:
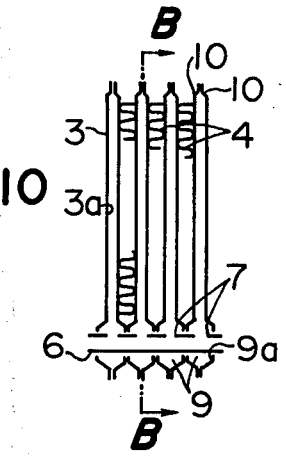
FIG. 10 is a sectional view taken along C—C line of FIG. 6.

Herein, as the case of FIG. 2, the outlet pipe 6 is inserted into the innermost of the outlet tank 9 and bores 7,7 are provided at respective positions below the flat pipes 3 of said pipe 6. It is of course that as the case of FIG. 2 to FIG. 5 of the 1st embodiment, said bores 7,7 may have different sizes depending upon their positions, or as shown in FIG. 7, the inlet pipe 5 and the outlet pipe 6 may be fitted by shifting to the windward side, or as shown in FIG. 8, the bores 7 may be provided by directing them toward the windward, or as shown in FIG. 9, the pipes 5, 6 may be shifted to the windward side as well as the bores 7 may be provided by directing them toward the windward.

Since the parallel flow type evaporator according to the 2nd embodiment of this invention is constructed as mentioned above, it will take favorable effect such as (1) the pressure-resisting property of the evaporator will be improved, because partitions are formed due to the intermediate portions joined at the central portion of passage for cooling medium by forming the flat pipes into U-shape; (2) the performance of the evaporator will be improved, because temperature distribution on the air outlet side is averaged due to the reciprocation of cooling medium across the air course; and (3) the outlet tank does not project above compared with the straight-flow type of evaporators shown in FIG. 2 to FIG. 5 having upper and lower tanks, because the flat pipes are formed into U-shape and the tanks are brought together at the lower portion, and even though the heat transmission area is made equal to the straight-flow type, the front area of core portion may be made smaller and the height of the evaporator may be made considerably small, resulting in favorable installation of the evaporator.

While preferred embodiments have been described, variations thereto will occur to those skilled in the art within the scope of the present inventive concepts which are depicted by the following claims.

What is claimed is:

1. A parallel flow type evaporator comprising a first and a second tank, a plurality of flat pipes communicating between said first and second tanks, fins inserted between adjacent flat pipes, an outlet pipe inserted into the innermost regions of said first tank and an inlet pipe communicating with said second tank, said outlet pipe and said inlet pipe inserted near the windward region of said first and second tanks, and said outlet pipe provided with a plurality of bores adjacent said flat pipes communicating between said first and said second tanks.

2. The evaporator of claim 1, wherein said bores provided in said outlet pipe are arranged on the windward side of said outlet pipe.

3. The evaporator of claim 2, wherein said first tank is an upper tank, said second tank is a lower tank, and said plurality of bores are provided at a region on said outlet pipe above each of said flat pipes communicating between said upper and said lower tanks.

* * * * *